Figure 1:
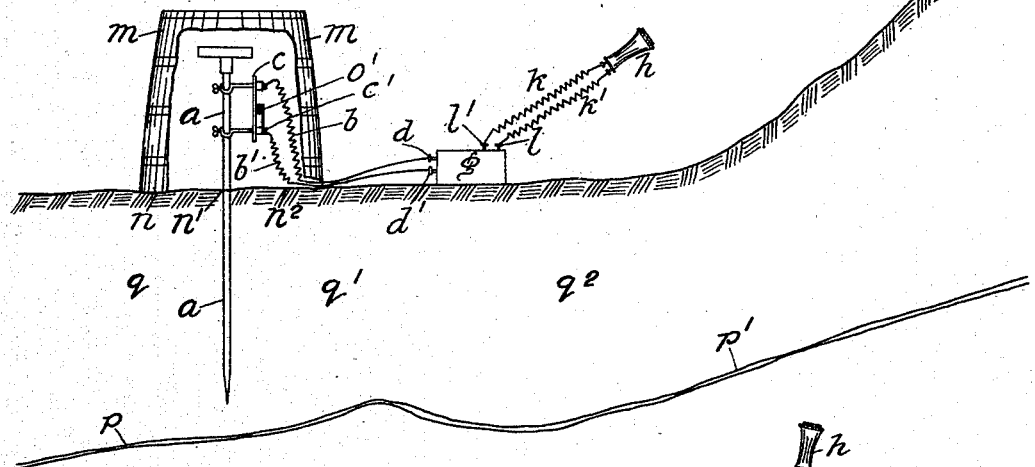
Figure 2:
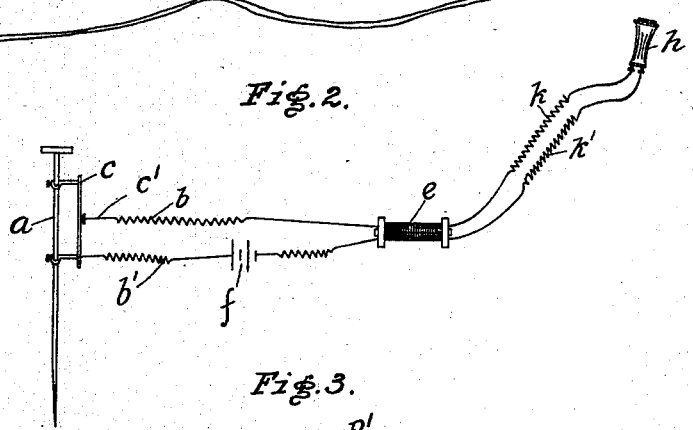
Figure 3:
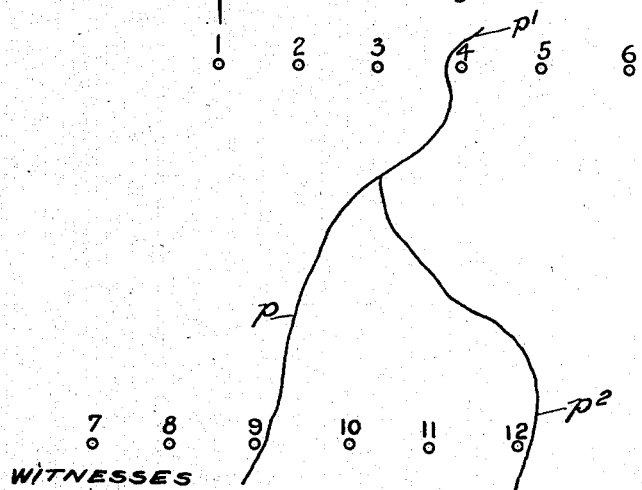

No. 714,775. Patented Dec. 2, 1902.
F. H. BROWN.
ELECTRICAL PROCESS OF LOCATING RUNNING WATER IN THE EARTH.
(Application filed Mar. 31, 1902.)
(No Model.)

WITNESSES

INVENTOR
Fred Harvey Brown

UNITED STATES PATENT OFFICE.

FRED HARVEY BROWN, OF LOS ANGELES, CALIFORNIA.

ELECTRICAL PROCESS OF LOCATING RUNNING WATER IN THE EARTH.

SPECIFICATION forming part of Letters Patent No. 714,775, dated December 2, 1902.

Application filed March 31, 1902. Serial No. 100,875. (No specimens.)

*To all whom it may concern:*

Be it known that I, FRED HARVEY BROWN, a citizen of the United States, residing at Los Angeles, in the county of Los Angeles and State of California, have invented a new and useful Process of Locating Running Water in the Earth, of which the following is a specification.

This invention relates to a process for locating veins of water in motion underneath the surface of the earth.

The object of the invention is to provide a process and mode of procedure whereby the presence of running water may be detected and the location thereof in the earth accurately and quickly determined.

The invention consists, substantially, in the mode of operation and procedure as will be more fully hereinafter set forth, as shown in the accompanying drawings, and finally pointed out in the appended claim.

In carrying my invention into practical operation I make use of the well-known law and fact that moving bodies, such as water moving in tortuous channels or fissures in the rocks, as they impinge against the rocks which incase them set up vibrations in the rocks and adjacent earth, which vibrations are the same in degree and form and in harmony and synchronous with the vibrations of the water. These vibrations extend to the surface of the earth when the water is not too far removed, and the device which I have constructed for use in carrying out the practical application of my invention and process is adapted to be inserted in the earth and rigidly fixed therein, so as to vibrate in harmony with the vibrations of the earth and the moving waters underneath. These percolating waters have varying degrees of vibrations, which give rise to certain concomitants of sound, such as pitch and tone qualities. To further carry out my process, I have arranged and constructed my device in such a manner that the portion of it which is inserted into the earth not only vibrates in harmony with the vibrations of the earth, but adapt other portions of the device to augment the volume of sound caused by the vibrations of the moving waters, so that these augmentations of sounds with their varying tone qualities may be distinctly heard and detected by the operator when the receiver or recording portion of the apparatus is placed to the ear, and after considerable practice by a person in the use of my device for carrying out my process one is enabled to judge of the relative and approximate depth of the running water from the surface and its comparative volume. By my system of detecting the sounds and vibrations caused by the running water and comparisons of their volume and tone qualities the presence of running water is indicated and its locality and approximate depth determined.

In carrying out my process a form of construction of apparatus which is quite simple and inexpensive is shown.

I will now describe my method and process, reference being had to the accompanying drawings, in which similar letters and figures indicate similar parts.

Figure I represents the application of my process in practice, the batteries and induction-coil being inclosed in a box $g$. The other portion of the device, which is rigidly inserted in the earth, is covered by an inverted bucket $m$. Fig. II is a diagrammatic view of the various parts and their connections of apparatus suitable for carrying out my new process. Fig. III is a graphic representation illustrating a part of my method, which consists in moving the instrument to different localities in order to designate points near to or more directly over the vein of running water $p$ $p'$ $p^2$.

Referring to Figs. I and III, the apparatus $a$ will be inserted at any convenient point—as, for instance, point 1 in Fig. III. When the two wires $b$ and $b'$, which are attached to the transmitter-diaphragm at $c$ and the contact-spring at $c'$, are connected at their other two ends to the binding-posts $d$ and $d'$, these binding-posts $d$ and $d'$ are in circuit with the primary of the induction-coil $e$ and battery $f$, which coil and battery are contained in the box $g$. In inserting the rod $a$ into the earth it must be pushed down as far as possible in order that it may be rigid in position. The windings of the permanent magnet in the receiver $h$ are connected by the wires $k$ and $k'$ to the binding-posts $l$ and $l'$. These binding-posts $l$ and $l'$ are connected in series with the secondary windings of the induction-coil $e$, Fig. II, which is inside the box $g$, Fig. I. After the rod $a$ is firmly inserted in the earth and the wires $b$ and $b'$ are connected with the box $g$, as shown and described in Fig. I, then the inverted bucket $m$ is placed over the rod $a$, as shown is Fig. I, the edge of the bucket being pushed forcibly down, as shown at $n$, $n'$, and $n^2$, in order to make as far as possible an air-tight chamber around the microphone $c$ and $c'$, the object of this bucket being to shunt off and protect the microphone from vibrations which might be caused by noises or sounds in the surrounding air, the walls of the bucket taking up and deadening any such atmospherical sounds.

Having described and shown the details and relative positions of the apparatus for carrying out my process, I will now further describe the manner of carrying the same into practical operation.

$p$ and $p'$ in Figs. I and III represent a vein of running water. The devices as described are set up as shown in Fig. I. The water running through the rocks sets them in vibration and also the superimposed earth $q$, $q'$, and $q^2$. The rod $a$, forming rigidly a part of the earth $q\ q'\ q^2$, also vibrates in harmony. The microphone $c$ and $c'$ being rigidly attached to and forming part of the rod $a$ also vibrates in harmony with the sounds. The current from the battery $f$, Fig. II, flows through the microphone $c$ and $c'$. The potential of this current is varied by the varying pressure of the contact-points $o$ and $o'$. The variation of this current so caused varies the magnetic potential of the induction-coil $e$, Fig. II, contained in the box $g$, Fig. I. These magnetic variations also vary the potential of the induced current in the secondary windings of the induction-coil $e$, which also varies synchronously the magnetic pull of the permanent magnet on the diaphragm contained in the receiver $h$, producing sounds in harmony with the sounds produced by the gurgling and percolating waters.

My method of procedure is further shown and indicated in Fig. III. The instrument is inserted in the earth at any point—say at the point marked 1. Having adjusted the parts as previously described, the receiver is placed to the ear, and if no vibrations of sounds are heard the instrument is moved to another point—say fifty feet away from point 1, as at point 2. The receiver is again put to the ear, and if no sounds are heard in the receiver it is again moved to another point, (designated as 3.) Slight sounds or vibrations may be heard at this point, owing to the proximity of the vein of water $p$ and $p'\,p$. The instrument is moved still farther then to, say, point 4, still farther to point 5. This point being farther removed from the vicinity of flowing water, the volume of sound will be diminished, which fact will indicate to the operator that point 4 was nearer and more directly over the moving water, and this point 4 will then be marked by a stake or stone or other suitable matter. The instrument will then be moved to a point, say, one hundred or more feet from the line of previous measurements, as indicated by the points 1, 2, 3, 4, 5, and 6, to a place as indicated at point 7 and a line of measurements taken above this second line paralleling the line of measurements previously taken, as indicated as from points 1 to 6. After the instrument is set up at point 7 the receiver will be placed to the ear, and if no sounds are heard it will be removed to point 8, and then, repeating this mode of procedure, it is evident that when the instrument is set up at point 9, which is directly over the stream of running water $p$ and $p'$, a greater volume of sound will again be heard, which would indicate that the running water was directly under point 9. By following this mode of procedure another point will be established, as at point 12 on the drawings, where the sounds will be of greater volume, indicating the presence of another vein under point 12. By continuing the above process indefinitely a chart of the running water may be established, staked off, and mapped.

It is obvious that the process and mode of operation above set forth may be carried out in a wide variety of forms and arrangements of specific apparatus, and I do not desire that my invention and process be limited to the form or arrangement of apparatus employed.

Having now set forth the object and nature of my invention and the manner of carrying it into practical operation, what I claim as my own is—

In a process for locating running water in the earth, the method of transforming the vibrations set up by the running water into electrical pulsations, then transforming these electrical pulsations into sound-waves then comparing the volume of sounds taken over a section of earth containing running water as compared with a similar section of earth removed from, and not containing running water.

FRED HARVEY BROWN.

Witnesses:
J. A. SHELBAMER,
MARY A. CONNERS.